(12) United States Patent
Navon et al.

(10) Patent No.: US 10,922,235 B2
(45) Date of Patent: Feb. 16, 2021

(54) METHOD AND SYSTEM FOR ADDRESS TABLE EVICTION MANAGEMENT

(71) Applicant: Western Digital Technologies, Inc., San Jose, CA (US)

(72) Inventors: Ariel Navon, Revava (IL); Shay Benisty, Beer Sheva (IL); Eran Sharon, Rishon Lezion (IL)

(73) Assignee: Western Digital Technologies, Inc., San Jose, CA (US)

( * ) Notice: Subject to any disclaimer, the term of this patent is extended or adjusted under 35 U.S.C. 154(b) by 62 days.

(21) Appl. No.: 16/453,458

(22) Filed: Jun. 26, 2019

(65) Prior Publication Data

US 2020/0409856 A1    Dec. 31, 2020

(51) Int. Cl.
*G06F 12/0891* (2016.01)
*G06F 12/0815* (2016.01)
*G06F 12/123* (2016.01)

(52) U.S. Cl.
CPC ...... *G06F 12/0891* (2013.01); *G06F 12/0815* (2013.01); *G06F 12/123* (2013.01)

(58) Field of Classification Search
CPC .................................................. G06F 12/0891
USPC .......................................................... 711/136
See application file for complete search history.

(56) References Cited

U.S. PATENT DOCUMENTS

| | | | |
|---|---|---|---|
| 8,898,423 B1 | 11/2014 | Guda et al. | |
| 9,063,862 B2 | 6/2015 | Wu et al. | |
| 9,104,327 B2 | 8/2015 | Gorobets et al. | |
| 9,229,876 B2 | 1/2016 | Slepon | |
| 9,251,052 B2 | 2/2016 | Talagala et al. | |
| 9,396,128 B2 | 7/2016 | Nawab Ali | |
| 9,710,383 B1 | 7/2017 | Xu et al. | |
| 2005/0144402 A1* | 6/2005 | Beverly | G06F 12/1475 711/152 |
| 2006/0143393 A1* | 6/2006 | Petev | G06F 12/122 711/133 |
| 2009/0113135 A1 | 4/2009 | Cain et al. | |
| 2009/0204765 A1 | 8/2009 | Gupta et al. | |

(Continued)

OTHER PUBLICATIONS 19.8. ZFS Features and Terminology, Chapter 19. The Z File System (ZFS), See pp. 3 and 4.

*Primary Examiner* — Jae U Yu
(74) *Attorney, Agent, or Firm* — Patterson & Sheridan, LLP; Steven H. Versteeg

(57) ABSTRACT

A system and method are disclosed for handling logical-to-physical mapping and increasing the amount of mapping table information that may be stored in a cache in volatile memory. The system includes a storage device having non-volatile memory, an input/output interface, a cache manager, a cache utilization manager, a cache swap manager, and a storage controller configured to service a storage command using a physical address provided by the cache manager. The method includes receiving a storage command comprising a logical address, the logical address comprising a partition identifier, implementing a cache eviction policy in response to determining that a mapping table cache does not have a cache entry that matches the logical address. The method also includes evicting the cache entry with a ranking, or score, that satisfies a cache eviction threshold and loading a replacement cache entry from an address mapping table stores on non-volatile memory.

20 Claims, 14 Drawing Sheets

(56) References Cited

U.S. PATENT DOCUMENTS

| | | |
|---|---|---|
| 2011/0087845 A1 | 4/2011 | Burger et al. |
| 2011/0145501 A1 | 6/2011 | Steely, Jr. et al. |
| 2012/0110247 A1 | 5/2012 | Eleftheriou et al. |
| 2012/0151146 A1 | 6/2012 | Olszewski et al. |
| 2013/0111116 A1 | 5/2013 | Inada et al. |
| 2013/0151781 A1 | 6/2013 | Wang et al. |
| 2013/0185508 A1 | 7/2013 | Talagala et al. |
| 2018/0293175 A1 | 10/2018 | Chang et al. |

\* cited by examiner

METHOD AND SYSTEM FOR ADDRESS TABLE EVICTION MANAGEMENT

BACKGROUND

A mapping table cache part of SSD Flash-Management, which is typically used in order to avoid the need to perform two read operations from the NAND Flash for each host read request, due to the need to perform first the logical address to physical address translation. However, due to the limited size of a mapping table cache in volatile memory, the mapping table cache needs to be managed in order to maximize the cache hit-rate and minimize the cache miss-rate. A conventional least recently used eviction policy is sub-optimal.

Mapping table cache eviction policy is typically based on least recently used (LRU) policy, where logical block address ranges that are not used for the longest time relative to other cache entries are evicted from the cache. One drawback of this policy is that an LRU policy does not take into account a frequency of references to certain logical block address ranges, and therefore may evict a cache entry for a logical block address range just before the logical block address range needs to be used again and hence an undesirable cache swapping may occur.

BRIEF SUMMARY

In order to address the problems and challenges noted above, an apparatus, system and method for handling address table eviction is disclosed.

According to a first aspect, a cache utilization manager is disclosed, configured to track cache utilization metrics of a mapping table cache based on a logical address, the logical address comprising a partition identifier, a starting logical block address, and a count. A cache swap manager is additionally disclosed, configured to replace a cache entry in the mapping table cache with a replacement cache entry, the cache entry having a partition access frequency that satisfies a cache eviction threshold.

According to another aspect, a system is disclosed where non-volatile memory is configured to store an address mapping table and volatile memory is configured to store a mapping table cache comprising a set of cache entries. An input/output (IO) interface configured to receive a storage command comprising a logical address that uniquely identifies a set of data blocks stored on the non-volatile memory. A cache manager is configured to load cache entries from the non-volatile memory into the volatile memory. A cache utilization manager configured to manage cache utilization metrics based on a partition access frequency and a cache access frequency. A cache swap manager is configured to determine, in response a cache miss, a cache eviction candidate based on the cache utilization metrics and on the logical address and to replace the cache eviction candidate in the mapping table cache with a replacement cache entry corresponding to the logical address of the storage command. Finally, a storage controller is configured to service the storage command using a physical address provided by the cache manager.

According to another aspect, a method is disclosed wherein receiving a read command comprising a logical address, the logical address comprising a partition identifier. Implementing a cache eviction policy in response to determining that a mapping table cache does not have a cache entry that matches the logical address, wherein the cache eviction policy comprises, ranking each cache entry in the mapping table cache based on cache utilization metrics that include a partition access frequency. The method also includes evicting the cache entry with a ranking that satisfies a cache eviction threshold. Finally, the method includes loading a replacement cache entry from an address mapping table stored on non-volatile memory, the replacement cache entry comprising a mapping of the logical address to a physical address.

Other embodiments are disclosed, and each of the embodiments can be used alone or together in combination. The embodiments will now be described with reference to the attached drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
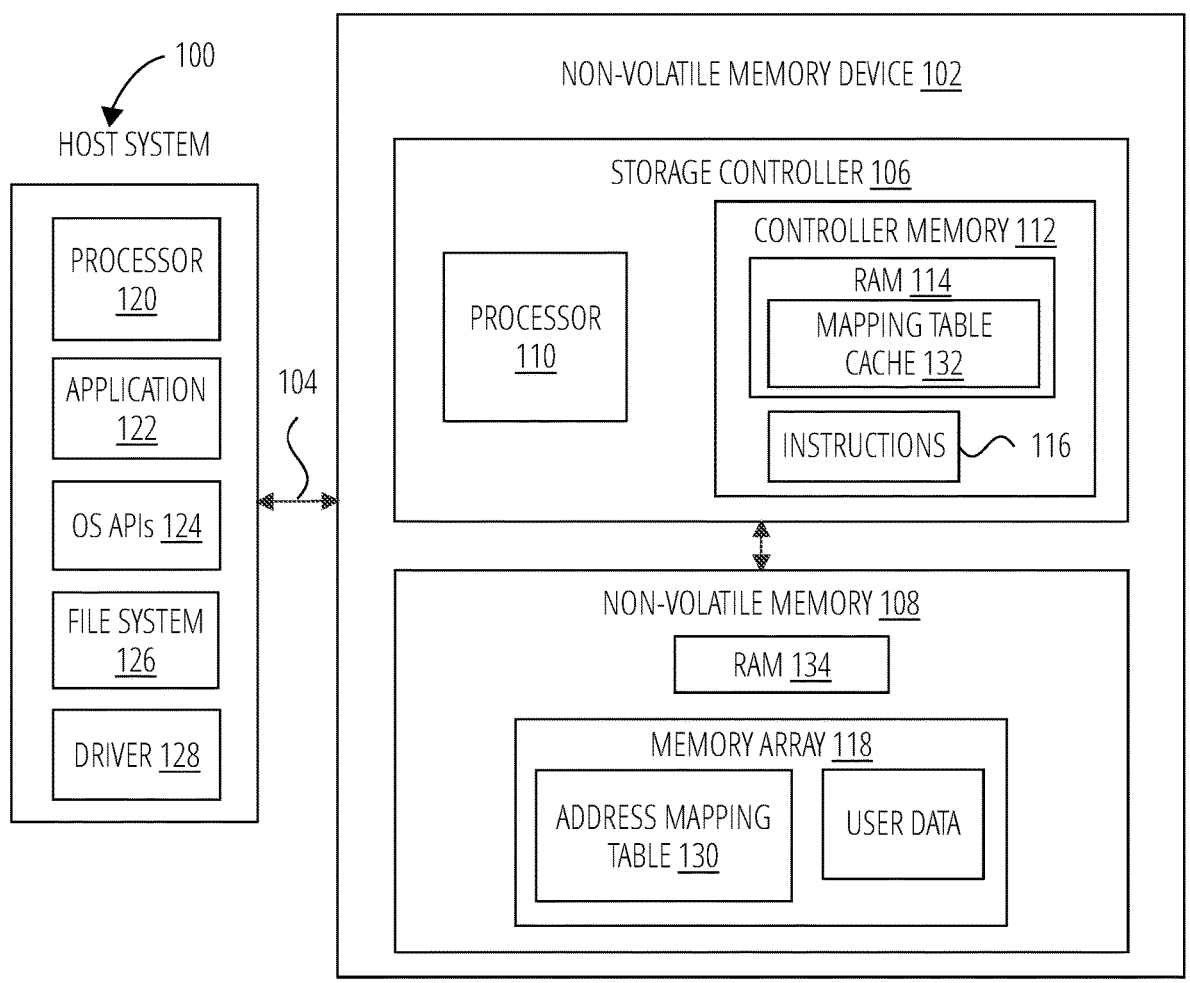
FIG. 1 illustrates a block diagram of host and storage device according to one embodiment.

Conventionally, a host device sends storage commands to a storage device using a block protocol. The storage command uniquely identifies a data block on the storage media using a logical block address (LBA). In certain block storage protocols, hosts, and applications executing on the host, can now use both an LBA and a partition identifier to uniquely identify a data block on the storage media. The storage device recognizes the partition identifier as a unique identifier for a logical partition of the storage media.

In the industry, a logical partition is referred to as a logical unit number (LUN) (with a LUN as the partition identifier) or as a namespace (with a namespace identifier (NSID) as the partition identifier). Both logical unit number and namespace can be used interchangeably herein. Both LUN and namespace identifier can be used interchangeably herein.

When writing or reading data to or from a non-volatile memory system, a host device typically uses commands that include addresses within a logical address space. The memory system maps these logical addresses to physical locations for data in the non-volatile memory cells, e.g., a FLASH memory. This description may reference FLASH memory by way of example, but the techniques are applicable to memory systems more generally.

When communicating with a FLASH memory system, the host device may provide logical addresses of data, such as in the form of a range of logical block addresses (LBAs). The memory controller may convert the LBAs, in one or more steps, to the actual physical addresses of data in the FLASH memory. For example, the LBAs from the host device may be mapped to memory system internal logical addresses, and the memory system internal logical addresses then mapped to the actual physical addresses. As another example, the LBAs from the host device may be mapped directly to the actual physical addresses in the FLASH memory.

A flash translation layer (FTL) of a FLASH memory system such as a solid state drive or hard disk drive may include a logical block address mapping table that translates logical addresses from host device commands (e.g., from host file systems) to physical addresses for logical groups in the FLASH memory.

A logical group may be smallest unit of data managed or addressed by the memory device memory manager. The size of logical group may for example be an entire memory block, a memory page, or even a partial memory page in some systems. Accordingly, non-volatile memory space required to store an address mapping table of some memory systems is high, and the address mapping table may be stored in the non-volatile memory cells (e.g., the FLASH memory), which is typically slower than random access volatile memory and also subject to write fatigue. Hence, many memory systems cache a portion of the address mapping table in a faster, volatile memory. Efficiently maintaining this mapping table cache is the subject of this disclosure.

The logical partition (or namespace or LUN) may be all or part of one or more storage devices such as a solid state drive or hard disk drive. A logical partition can thus reference an entire RAID set, a single drive or partition, or multiple storage drives or partitions. The logical partition is treated as if it is a single device and is identified by the partition identifier.

A mapping table cache eviction mechanism disclosed herein is configured to optimize mapping table cache performance in partition identifier-based storage systems. Cache entries are evicted, as needed, based at least in part on cache utilization metrics that factor in the partition identifier. A set of related partition identifiers for each mapping table cache entry is maintained. When a new storage command arrives that is not represented in the current content of the address mapping table, a "partition similarity score" for the partition identifier of the storage command and each entry in the address mapping table is computed. A modified least recently used score (MLRU score) may also be computed for each mapping table cache entry. The modified least recently used score takes into account an elapsed period (either time-wise, access-wise, or a combination thereof) since the respective mapping table cache entry was last used in addition to how frequently the cache entry was referenced, either in the same, or a different time period. The decision of which entry to evict, or whether or not to evict an entry, from the mapping table cache, in certain embodiments, may then be based on a combination of the modified least recently used score and the partition similarity score.

A non-volatile memory system suitable for use in implementing certain embodiments is shown in FIG. 1. A host system 100 stores data into, and retrieves data from, a non-volatile memory device 102. The non-volatile memory device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data generating devices, such as a personal computer, a mobile telephone, a personal digital assistant (PDA), or the like. The host system 100 communicates with the storage device over a communication channel 104.

The non-volatile memory device 102 contains a storage controller 106 and a non-volatile memory 108. As shown in FIG. 1, the storage controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as random access memory (RAM 114) and/or non-volatile memory, and processor executable instructions 116 for handling memory management. The RAM 114 may include one or more of any of a number of types of RAM, such as static RAM (SRAM) or dynamic RAM (DRAM).

As discussed in more detail below, the non-volatile memory device 102 may include functions for memory management. In operation, the processor 110 may execute memory management instructions (which may be resident in instructions 116) for operation of memory management functions. The memory management functions may control the assignment of the one or more portions of the non-volatile memory 108 within the non-volatile memory device 102.

The non-volatile memory 108 may include non-volatile memory media (such as FLASH memory). One or more memory types may be included in non-volatile memory 108. The memory may include memory array 118. In embodiments where the non-volatile memory 108 includes FLASH memory as non-volatile memory, the memory array 118 may be made up of the same type of FLASH memory cell or different types of FLASH memory cells. For example, the memory array 118 may consist of both single-level cell (SLC) type FLASH and a multi-level cell (MLC) type FLASH memory having two or more bit per cell capacity to take advantage of the higher write speed of SLC flash and the higher density of MLC flash. Different combinations of FLASH memory types are also contemplated for the memory array 118. Additionally, the non-volatile memory 108 may also include volatile memory such as any of a number of forms of random access memory (RAM 134).

The memory array 118 of non-volatile memory 108 may include physical blocks of FLASH memory that each consists of a group of pages, where a block (also referred to as erase blocks) is a group of pages and a page is a smallest unit of writing in the memory. The physical blocks in the memory include operative blocks that are represented as logical blocks to the file system 126. The non-volatile memory device 102 may be in the form of a portable flash drive, an integrated solid state drive or any of a number of known flash drive formats. In yet other embodiments, the non-volatile memory device 102 may include only a single type of FLASH memory having one or more partitions.

Referring again to FIG. 1, the host 100 may include a processor 120 that runs one or more application programs 122. The application programs 122, when data is to be stored on or retrieved from the non-volatile memory device 102, communicate through one or more operating system application programming interfaces (APIs) 124 with the file system 126. The file system 126 may be a software module executed on the processor 120 and manages the files in the non-volatile memory device 102. The file system 126 manages clusters of data in logical address space. Common operations executed by a file system 126 include operations to create, open, write (store) data, read (retrieve) data, seek a specific location in a file, move, copy, and delete files. The file system 126 may be circuitry, software, or a combination of circuitry and software.

Accordingly, the file system 126 may be a stand-alone chip or software executable by the processor of the host 100. A storage device driver 128 on the host 100 translates instructions from the file system 126 for transmission over a communication channel 104 between the host 100 and non-volatile memory device 102. The interface for communicating over the communication channel 104 may be any of a number of known interfaces, such as SD, MMC, USB storage device, SATA and SCSI interfaces. The host 100 utilizes the file system data structure to maintain a logical address range 202 for all logical block addresses (LBAs) that have been assigned by the host system to data.

In addition to the user data and host-generated file system data structures that may be stored in FLASH memory on the non-volatile memory device 102, the storage device itself stores and maintains a logical-to-physical mapping table or other data structure that tracks the logical addresses supplied by the host file system and the physical addresses where the storage device is keeping the data. A primary logical-to-physical mapping table, sometimes referred to as an address mapping table 130 may be stored in main memory 120. A copy of a portion of the address mapping table 130 may be cached in RAM 114 in the non-volatile memory device 102 as a mapping table cache 132 for faster access to the logical-to-physical mapping information.

Figure 2:
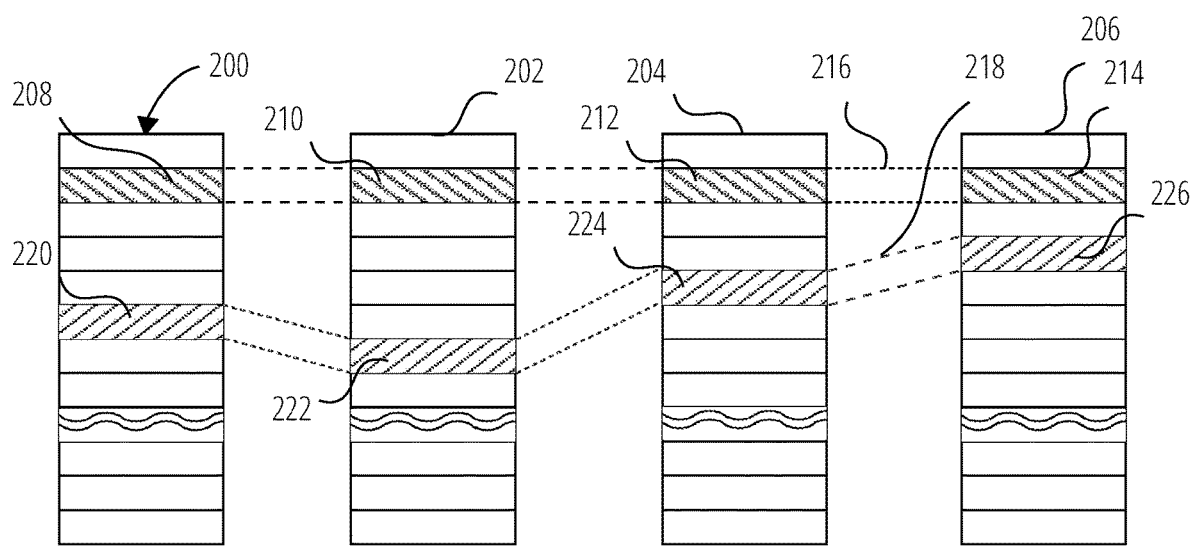
FIG. 2 illustrates a plane 200 in accordance with one embodiment.

Referring to FIG. 2, the memory array 118 (e.g., MLC flash respectively) may be arranged in blocks of memory cells. In the example of FIG. 2, four planes or sub-arrays 200, 202, 204 and 206 memory cells are shown that may be on a single integrated memory cell chip, on two chips (two of the planes on each chip) or on four separate chips. Other numbers of planes may exist in a system. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
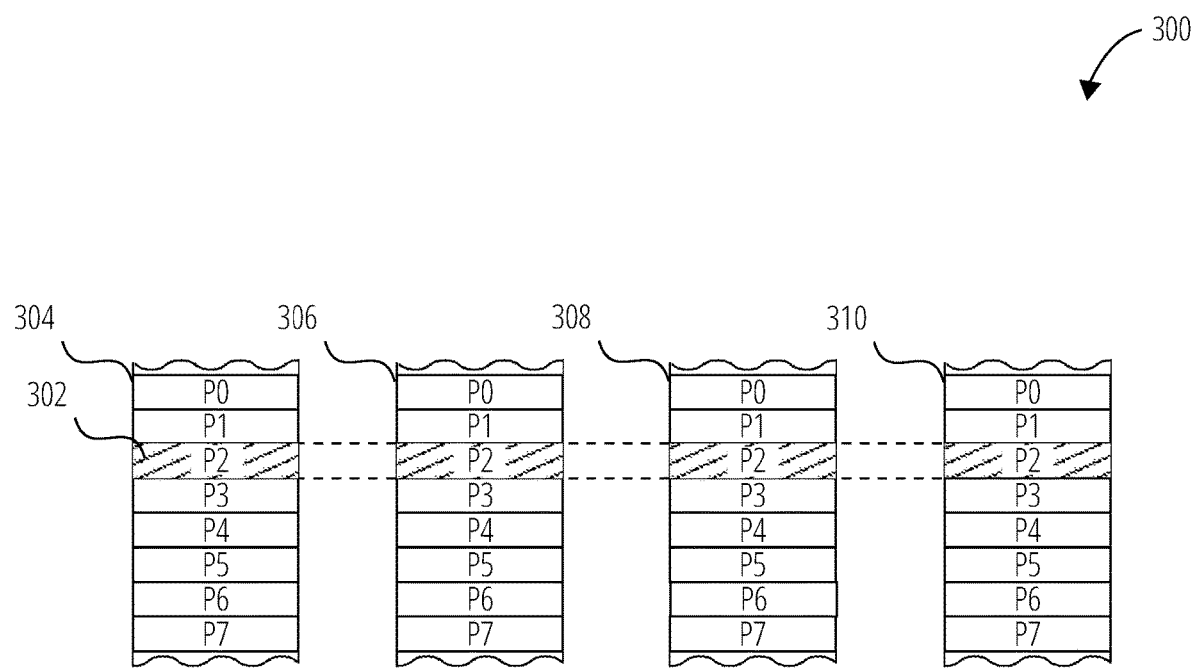
FIG. 3 illustrates a pages of memory cells 300 in accordance with one embodiment.

The individual blocks are in turn divided for operational purposes into pages of memory cells, as illustrated in FIG. 3. The memory cells of each of blocks 304, 306, 308 and 310, for example, are each divided into eight pages P0-P7. Alternately, there may be 16, 32 or more pages of memory cells within each block. A page is the unit of data programming and reading within a block, containing the minimum amount of data that are programmed or read at one time. A metapage 302 is illustrated in FIG. 3 as formed of one physical page for each of the four blocks 304, 306, 308 and 310. The metapage 302 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host. The LBAs are then mapped to one or more physical blocks in the non-volatile memory device 102 where the data is physically stored.

An update mapping table or data structure may be maintained to handle updates to the memory that have not yet had time to be transferred to the primary mapping table. For example, a group address table "delta," may include updates to the address mapping table 130 that have not yet had time to be stored in the address mapping table 130.

Figure 4:
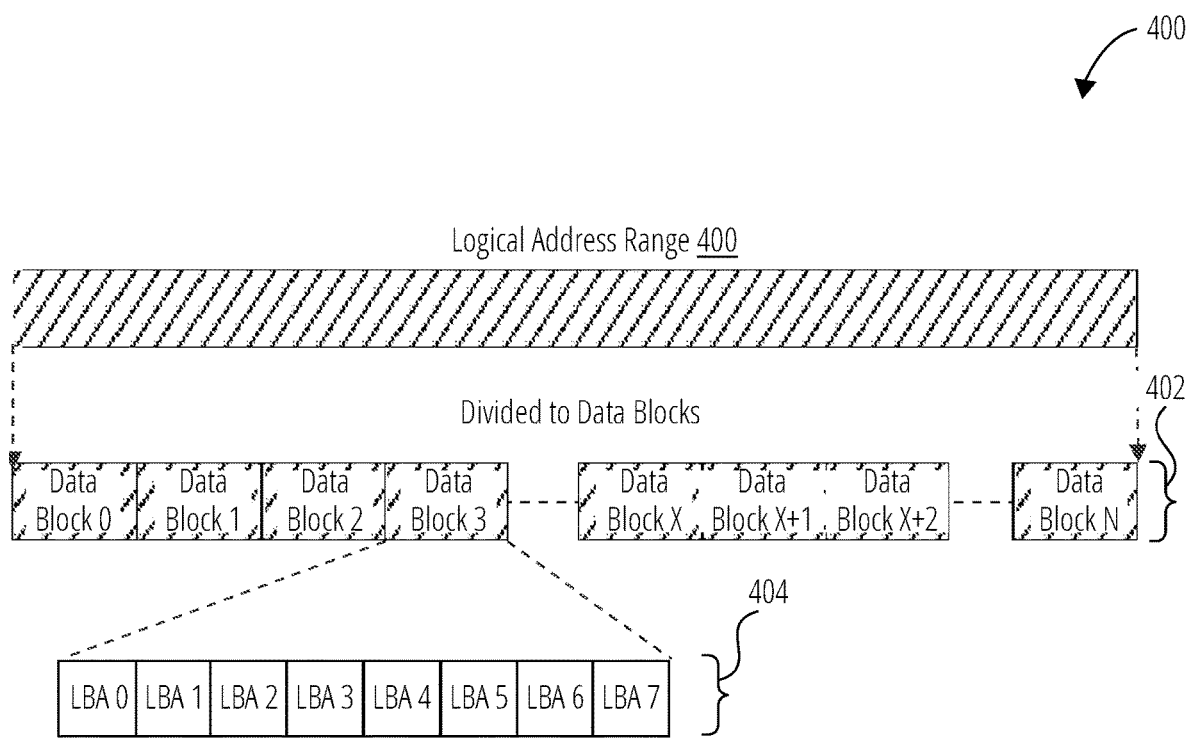
FIG. 4 illustrates an embodiment of logical address range 400 managed by the host and data blocks handled within the storage device.

Referring now to FIG. 4, an example logical address range 400 for data blocks assigned by the host system 100 to data is shown. These sectors, each associated with a logical block address (LBA) 404 are grouped into equal sized data blocks 402. In one implementation, the data blocks 402 may each include 8 sequential and contiguous LBAs 404, and the logical address range 400 is divided into a whole number of data blocks 402. As part of the process of writing and erasing data having LBAs that fall within specific data blocks 402, certain fragments of data blocks 402 may be written into the binary cache 118 portion of the FLASH memory 108 rather than to the main storage 120 portion of the FLASH memory 108, a mapping table such as the is necessary to track what physical addresses in non-volatile memory have been assigned to which logical addresses. The mapping table cache 132 may be kept in non-volatile memory 108. The address mapping table entries provide the logical to physical mapping for logical units of data. As noted previously, a copy of some portions of the address mapping table (referred to herein as cache entries) may also be cached in RAM 114 in the non-volatile memory device 102. The cache entries point to the physical locations for the data blocks in the memory array 118 for each of the respective data blocks.

A non-volatile memory device 102 may typically respond to a host query regarding data associated with logical addresses by methodically first searching the mapping table cache from memory array 118 and/or RAM 114, respectively. If space and cost issues permitted a large amount of volatile memory (e.g. RAM 114 in the storage controller 106), one way to maintain an address mapping table 130 of all logical to physical address relationships in the storage device is to maintain the entire table in FLASH memory (such as NAND flash) and to then copy the entire table into fast access memory such as the RAM 114 in the storage controller 106 of the non-volatile memory device 102. In some storage device architectures a limited amount of RAM is available, where the RAM space is needed both to cache data written to or read from the NAND flash and to handle mapping table data, and the RAM 114 is not big enough to hold the entire address mapping table 130.

Figure 5:
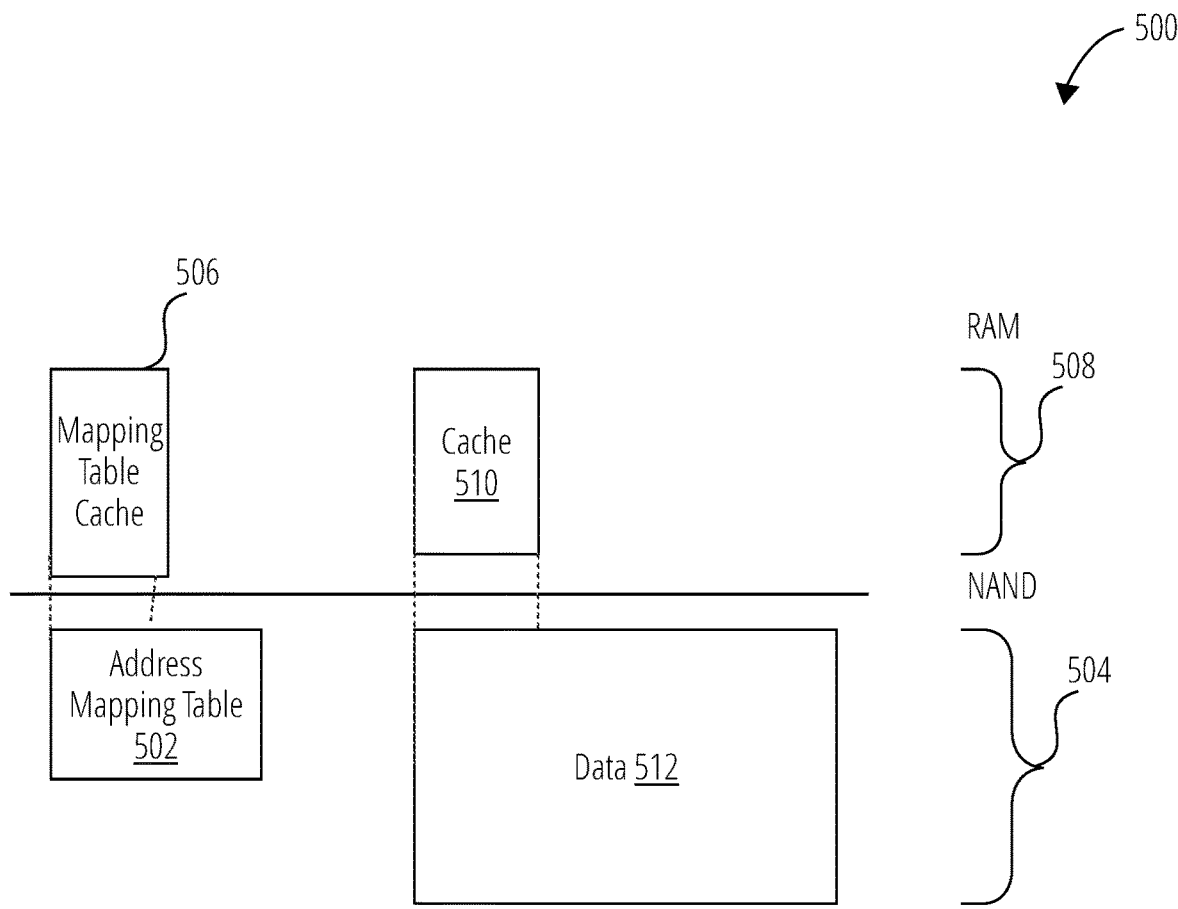
FIG. 5 illustrates a storage device 500 in accordance with one embodiment.

A simplified version of the memory 102 is shown in FIG. 5 to illustrate a storage device 500 where there is reduced space available in fast access media as compared to the non-volatile media. Specifically, in this architecture the address mapping table 502 and user data 512 mapped by the address mapping table 502 are contained in non-volatile memory such as NAND flash memory 504. The address mapping table 502 may be broken down into a number of equal, fixed size cache entries. As discussed below, the most active cache entries may be brought into the mapping table cache 506 in fast access media such as RAM 508. With this arrangement, during random access to the non-volatile memory device 102, some cache entries of the address mapping table can be accessed from the RAM 508 or other fast access media.

Figure 6:
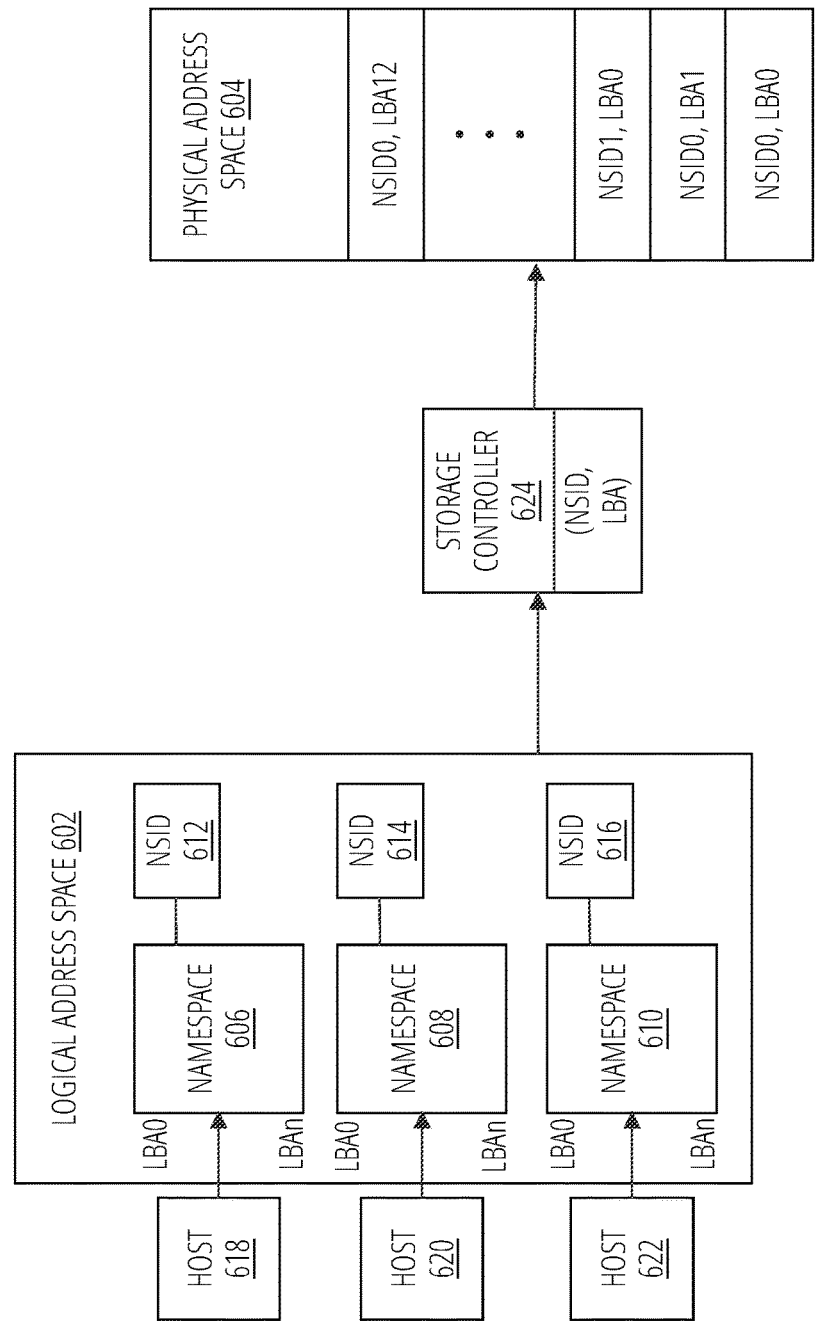
FIG. 6 illustrates a relationship between namespaces and physical address space 604 in accordance with one embodiment.

FIG. 6 illustrates a relationship between a logical address space 602 and a physical address space 604 on a memory array 118. The logical address space 602, in one embodiment, is divided into logical addresses corresponding to respective data blocks. In some embodiments, the logical addresses are LBAs (in other embodiments, the logical addresses may correspond to some other form of logical identifiers). in one embodiment, a namespace is a range of contiguous unique and monotonically increasing logical block addresses.

In one embodiment, data blocks may represent the smallest amount of data associated with a given logical address. Data blocks may be further divided into sectors. As but one example, a sector may be 512 bytes and a data block may include 8 sectors and be 4 KB. Data blocks are quantities of space allocated for and storing data on the physical address space 604. The LBAs represent the data blocks in the logical address space 602.

The logical address space 602 is further divided into namespaces. A namespace is a logical sub-dividing of the logical address space 602. A namespace may also be interchangeably referred to as a logical partition or logical unit number (LUN). in one embodiment, a namespace is a range of contiguous and monotonically increasing logical block addresses. Each namespace of a plurality of namespaces represented in the logical address space 602 comprises a set of logical block addresses (LBA). FIG. 6 illustrates, as an example, a division of the logical address space 602 into three namespaces (namespace 606, namespace 608, namespace 610). The logical block addresses of each namespace are not unique between namespaces. For example, each namespace includes LBA0, LBA1, LB2, etc. In order to translate a namespace LBA to an LBA in the logical address space 602, each namespace is uniquely identified using a namespace identifier (NSID, e.g., NSID 612, NSID 614, NSID 616).

A namespace identifier (NSID), as used herein, comprises any indication that uniquely identifies one namespace with respect to other namespaces within the same logical address space. For example, a namespace identifier may include a file identifier and/or an offset from a file system namespace, a logical unit number (LUN), a LUN ID and an offset from a LUN namespace, an LBA, or LBA range from a storage namespace, one or more virtual memory addresses from a virtual memory namespace, a volatile memory address from a volatile memory namespace of the host device, an object identifier, a network address, a GUID, UUID, a BAR address or address range from a BAR namespace, another logical identifier, or the like. In a further embodiment, a namespace identifier may comprise a label or a name for a namespace, such as a directory, a file path, a device identifier, or the like. In another embodiment, a namespace identifier may comprise a physical address or location for data.

Referring still to FIG. 6, a plurality of host devices (host 618, host 620, and host 622) are assigned at least one namespace designated by a corresponding NSID (e.g., NSID 612, NSID 614, NSID 616). The hosts assign write command (and the associated data) to LBAs within their assigned namespace. The LBAs of the namespace range from LBA0 to LBAn, in one example. (FIG. 6 illustrates each namespace having the same size, but other embodiments have namespaces of different sizes). In this example, host 618 is allotted/assigned namespace 606, identified by NSID 612. Host 620 is allotted/assigned namespace 608, identified by NSID 614. Finally, host 622 is allotted/assigned namespace 610, identified by NSID 616.

The storage controller 624 manages where host data is stored in physical memory. Specifically, the storage controller 624 translates or maps between logical identifiers in the logical address space 602 to physical addresses in physical address space 604. In the embodiment illustrated in FIG. 6, the storage controller 624 translates a logical identifier that includes an NSID and an LBA into a physical address for the LBA on the storage media. The storage controller 624 may develop a table, or other data structure, relating the NSID and LBA of the data used by the host to a physical address within the physical address space 604.

The physical address space 604, in one embodiment, is divided into physical addresses corresponding to the arrangement of data on the physical recoding media. In the embodiments described herein, the physical recording media is asymmetric, write-once media, such as memory array 118. The storage controller 624 manages the memory array 118 in such a way as to overcome certain challenges of asymmetric, write-once media. One technique used by the memory array 118 is to maintain a set of open erase block that are prepared to receive data associated with write commands.

In the illustrated embodiment, each data block of the physical address space 604 can be uniquely identified based on the NSID and LBA.

Figure 7:
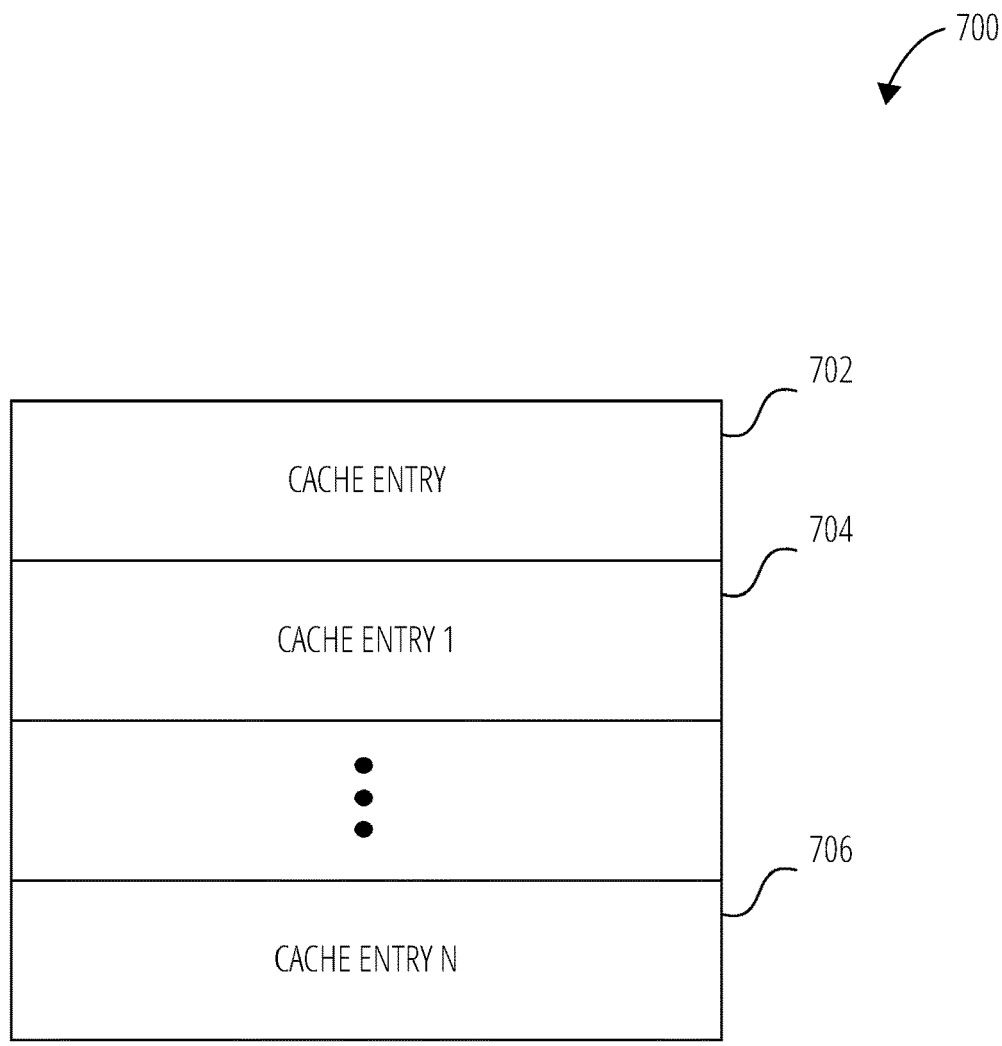
FIG. 7 illustrates a mapping table cache 700 in accordance with one embodiment.

FIG. 7 shows how the logical mapping space in the mapping table cache 700 may be broken down into N cache entries (cache entry 702, cache entry 1 704, cache entry N 706, each cache entry having an equal number of LBA references/mappings to physical addresses for data blocks.

In one embodiment, each cache entry includes a logical address and a physical address for where the data block(s) associated with the logical address are stored on the non-volatile memory 108. In certain embodiments, the logical address uniquely identifies one or more data blocks on the non-volatile memory 108 because the logical address is made up of an NSID and an LBA identifier. In one embodiment, the LBA identifier is a combination of a starting LBA and a count. Because LBA are sequential and monotonically increasing, the system derives the next data block LBA because the next data block LBA is the next LBA in the LBA sequence. In other embodiments, the LBA identifier is a starting LBA and a range of LBAs that the storage command relates to.

In one embodiment, a cache entry includes plurality of tuples, each tuple includes an NSID, an LBA, and a physical address. In such an embodiment, the NSID and LBA uniquely identify a data block and its logical address within the logical address space serviced by the cache manager.

In the example of FIG. 7, assuming for discussion purposes a 32 gigabyte addressable storage capacity in the non-volatile memory 108, the mapping table cache 700 may be broken down into 8,192 cache entries, where each cache entry references 1,024 data blocks, using the LBAs. The size selected for the whole number of fixed size cache entries in the mapping table cache 700 is arbitrary and may be set to any of a number of desirable sizes for the particular memory device. In one embodiment, the size of each data blocks may be set to the smallest size that can be processed by an error correction code mechanism in the memory device, which may be 4 kilobytes (kB) in one example.

A technique for reducing the problem of determining which cache entry to evict when the mapping table cache is full is to include the partition identifier in the determination of a cache eviction candidate. In one embodiment, RAM 508 may be in the storage controller 106 of the non-volatile memory device 102, such as RAM 114 (FIG. 1).

Figure 8:
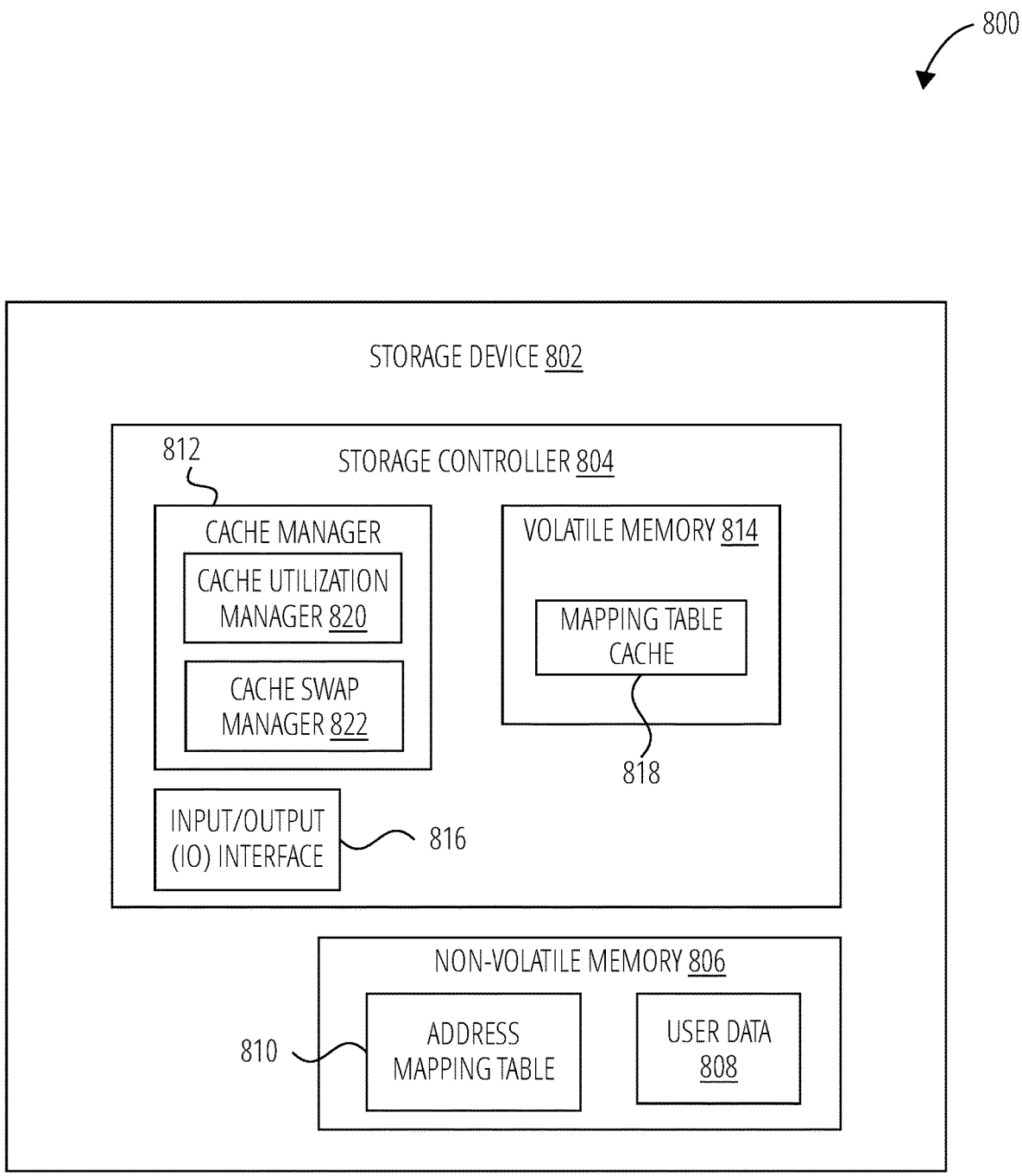
FIG. 8 illustrates a system 800 in accordance with one embodiment.

FIG. 8 illustrates a storage device 802 configured to implement a cache eviction policy in accordance with the claimed solution. A cache eviction policy is a set of methods, rules, and requirements that are used to determine which cache entry to evict when a cache miss occurs. The storage device 802 includes a storage controller 804 and non-volatile memory 806. The non-volatile memory 806 includes stored user data 808 and at least one full copy of an address mapping table 810. In certain embodiments, the address mapping table 810 may also be referred to as a group allocation table (GAT table).

The storage controller 804 includes a cache manager 812, volatile memory 814, and an input/output (IO) interface 816. The input/output (IO) interface 816 receives storage commands from the host and returns data and/or a response to the host for each command. The storage controller 804 services storage commands (e.g., read commands, write commands, storage device 802 maintenance operations) using a physical address provided by the cache manager 812. As used herein, the term storage command refers to any command that a storage controller services including commands issued by a storage device or host external to the storage controller as well as any commands issued by components or modules internal to the storage controller. Examples of storage commands include, but are not limited to, read commands, write commands, status commands, test mode commands, garbage collection (data relocation commands), read scrub (refreshing of data values stored in memory cells) commands, and the like. The volatile memory 814 is typically limited in size and stores a mapping table cache 818. The mapping table cache 818 holds a portion of the data (e.g., cache entries see FIG. 7) stored in the address mapping table 810.

The cache manager 812 is configured to load cache entries from the non-volatile memory into the volatile memory 814. The cache manager 812 is configured to store modified cache entries of the volatile memory 814 on the non-volatile memory 806. The cache manager 812 includes a cache utilization manager 820 and a cache swap manager 822.

The cache utilization manager 820 is configured to manage cache utilization metrics based on a partition access frequency and a cache access frequency. The cache utilization manager 820 may gather, track, record, monitor, revise, and/or adjust cache utilization metrics as the storage device 802 operates. In one embodiment, the cache utilization manager 820 manages cache utilization metrics that factor in (i.e. include) a partition identifier, starting logical block address, and a count provided as parts of the logical address.

The cache swap manager 822 is configured to determine, in response a cache miss, a cache eviction candidate based on the cache utilization metrics and on a logical address of a storage command (e.g., read command or write command) and to replace the cache eviction candidate in the mapping table cache 818 with a replacement cache entry corresponding to the logical address of the storage command. In another embodiment, rather than the cache swap manager 822, the cache manager 812 may replace the cache eviction candidate with the replacement cache entry. In one embodiment, the cache swap manager 822 identifies a cache eviction candidate based on a partition access frequency that satisfies a cache eviction threshold.

A cache eviction threshold is a criteria that defines when a cache entry should be evicted from a mapping table cache. Specifically, in one embodiment, a cache eviction threshold defines a level that a cache utilization metric must satisfy to be evicted from the mapping table cache. In a certain embodiment, the cache eviction threshold is a minimum number of times that a partition is referenced by a storage command serviced by the storage device 802 in order to avoid being evicted from the mapping table cache. In other words, in certain embodiments, the cache eviction threshold may be a minimum partition access frequency that a cache entry must reach, or exceed, for a partition referenced by the storage command serviced by the storage device 802 or else the cache entry will be evicted from the mapping table cache.

The storage controller 804 additionally includes volatile memory 814, configured to store a mapping table cache 818 comprising a set of cache entries. An input/output (IO) interface 816 configured to receive a storage command comprising a logical address that uniquely identifies a set of data blocks stored on the non-volatile memory. The storage device 802 also includes non-volatile memory 806 comprised of an address mapping table 810 and user data 808.

Figure 9:
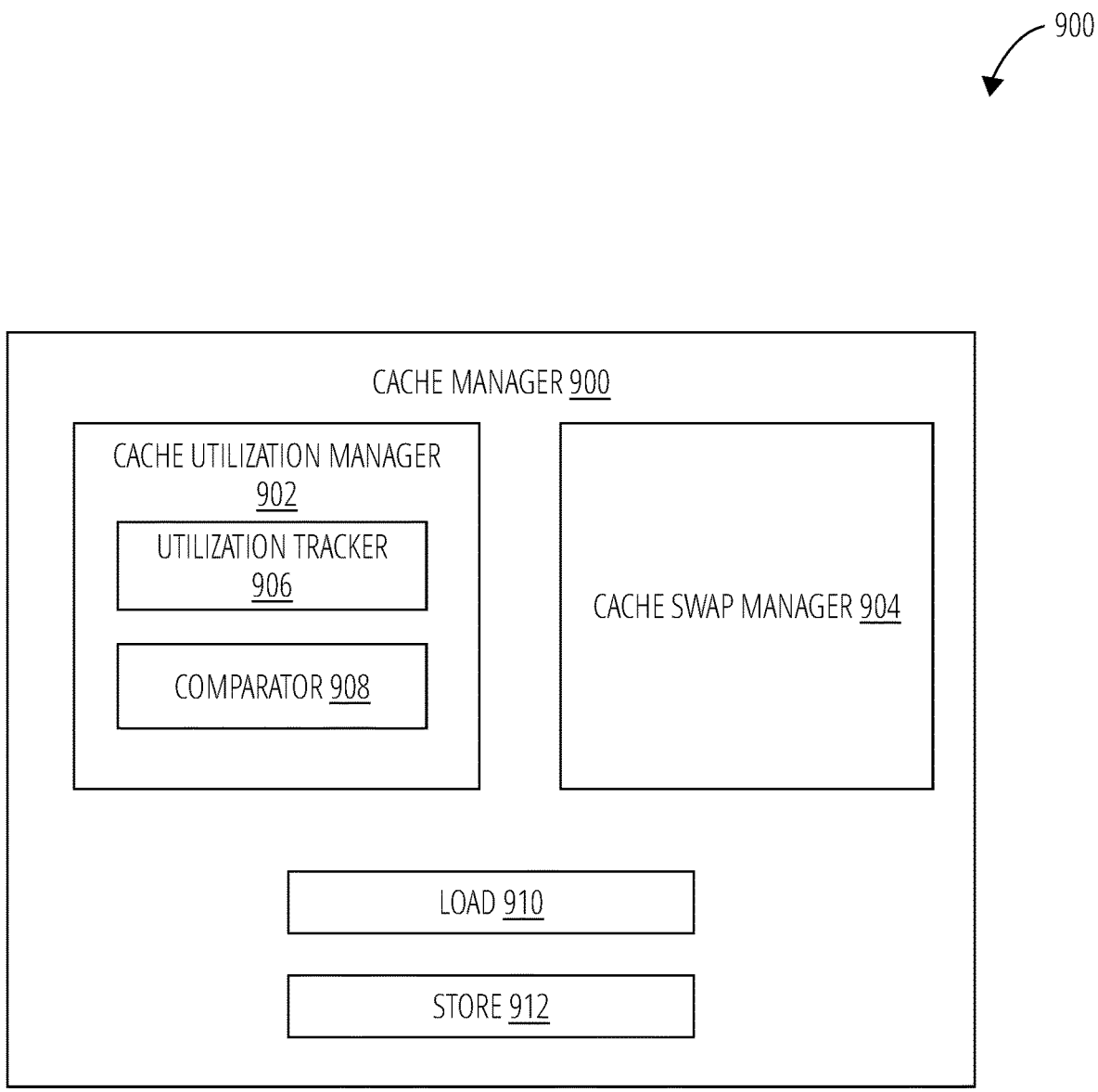
FIG. 9 illustrates a cache manager 900 in accordance with one embodiment.

FIG. 9 illustrates components in one embodiment of a cache manager 900. The cache manager 900 includes a cache utilization manager 902, a cache swap manager 904, a load module 910 that loads cache entries from the address mapping table 810 and a store module 912 that stores modified cache entries to the address mapping table 810 in non-volatile memory 806.

The cache utilization manager 902 manages and/or tracks a set of cache utilization metrics for the cache entries. A partition access frequency and cache access frequency are but two, of many possible, cache utilization metrics, that the cache manager 900 may track, and use, for mapping table cache management. As used herein, a cache utilization metrics is any measure that use useful for managing the operation of a mapping table cache. Examples of cache utilization metrics include, but are not limited to, partition access frequency, cache access frequency, historical use of the mapping table cache over time, use rates for the mapping table cache by particular hosts, and the like.

The cache utilization manager 902 comprises a utilization tracker 906 configured to monitor, for each cache entry, which partitions are associated with the cache entry and to monitor a partition access frequency that identifies how many times a partition is referenced by a storage command serviced by the storage device 802. In one embodiment, the utilization tracker 906 uses the partition identifier (e.g., LUN, NSID, or the like) to track which partitions are referenced in each cache entry and how often the partition is referenced by a storage command.

In one embodiment, the utilization tracker 906 maintains a record of which partitions are referenced within each cache entry in the mapping table cache. The record may be maintained in a variety of data structures, such as a list or a table. The record may be stored in volatile memory 814. In one example, a cache entry may include mappings of LBAs to physical addresses for a single partition (e.g., partition identifier). In such an example, the number of partitions associated with the cache entry is one. In another example, each logical address to physical address reference in a cache entry may reference a different partition, by way of its partition identifier. In this example, the number of partitions associated with the cache entry is equal to the number of logical address to physical address mappings the cache entry includes (e.g., 1024 partition identifiers). As each cache entry 702 may reference a plurality of logical addresses, the utilization tracker 906 may track a plurality of partition identifiers associated with each cache entry.

In addition, or in an alternative embodiment, the utilization tracker 906 tracks, or counts, how many times each partition is referenced by a storage command received by the storage device 802. This count is referred to herein as a partition access frequency. In certain embodiments, the partition access frequency is a measure of the number of times each partition in a cache entry is referenced by a storage command over a period of time, such as x minutes, or y hours, or z days. In another embodiment, the partition access frequency is a measure of the number of times each partition in a cache entry is referenced by a storage command over a certain number of serviced storage commands, or a certain number storage commands of a certain type, such as read commands.

In one embodiment, the utilization tracker 906 may measure partition access frequency by adding to the partition access frequency no more than once for each storage command received. In another embodiment, since a logical address includes a partition identifier and an LBA to uniquely identify a data block, a number of storage commands may frequently reference a particular logical partition each time another LBA for the same partition is referenced. Consequently, the utilization tracker 906 may track high count values for a partition access frequency by adding to the partition access frequency for each LBA referenced, even if the LBA referenced is in a set of LBAs referenced indirectly by a logical address that includes the partition identifier, a starting LBA, and count for the number of LBA involved in the storage command.

The utilization tracker 906 tracks a cache access frequency for each cache entry in the mapping table cache. In this manner, the cache access frequency for one cache entry can be compared against the cache access frequency of other cache entries in the mapping table cache. A cache access frequency is a measure of a number of times that any logical address included within a cache entry is referenced by a storage command received by the storage device 802. In certain embodiments, the utilization tracker 906 adds to the cache access frequency for references for all storage command, including read commands, write commands, and/or maintenance operation commands. In certain embodiments, the utilization tracker 906 adds to the cache access frequency exclusively for references for certain types of storage commands, such as read commands, or write commands, or maintenance operation commands.

In certain embodiments, the cache access frequency is a measure of the number of times each cache entry is referenced by a storage command over a certain period of time, such as x minutes, or y hours, or z days. In another embodiment, the cache access frequency is a measure of the number of times each partition in a cache entry is referenced by a storage command over a certain number of serviced storage commands, or a certain number storage commands of a certain type, such as read commands.

In one embodiment, the utilization tracker 906 stores (e.g., on non-volatile memory 806) one or more cache utilization metrics for each cache entry such that historical cache utilization metrics analysis can be done by the cache utilization manager 902 to determine how the cache utilization metrics may change over time.

The comparator 908 reviews, analyzes, and uses cache utilization metrics to evaluate each cache entry. In particular, the comparator 908 uses cache utilization metrics to make a determination, or prediction based on a likelihood, as to which cache entries are most likely include logical addresses that will be referenced by future storage commands. In one embodiment, the comparator 908 represents this determination or prediction using a score or ranking for each cache entry. In one embodiment, the comparator 908 determines a score for each cache entry in the mapping table cache. The score, in one embodiment, is based on cache utilization metrics.

In one embodiment, the comparator 908 determines a ranking for each cache entry in the mapping table cache, in place of a score or that is based on the score. Those of skill in the art will appreciate that a score and a ranking may be the same type of prioritization for cache entries, but a score and a ranking may also be very different methods of identifying which cache entries to hold in the mapping table cache. Generally, the comparator 908 determines the score or ranking to identify which cache entry to evict, or remove, from the mapping table cache in response to a cache miss. The cache entry identified as the cache entry to evict from the mapping table cache is called the cache eviction candidate. Those of skill in the art recognize that the score or ranking of cache entries may identify the cache eviction candidate based on the highest score or ranking or based on the lowest score or ranking, depending on the embodiment. Examples used herein, identify the cache eviction candidate based on the lowest score or ranking.

The comparator 908 may use one or more of the cache utilization metrics. Alternatively, the comparator 908 may use a combination of one or more of the cache utilization metrics. Furthermore, the comparator 908 may use a combination of one or more of the cache utilization metrics and other metrics available to the cache manager 900 to score and/or rank cache entries.

In one embodiment, the comparator 908 determines a score for a cache entry based, at least in part, on a partition similarity score. A partition similarity score is a measure of how related a partition associated with a partition identifier of a received storage command is to one or more partitions referenced in a cache entry currently loaded in the mapping table cache. In one embodiment, the partition similarity score is measured on a scale from 0 to 1, with 0 meaning there is very little, or no, similarity between the partition identifier of the storage command and partitions referenced in the cache entry and 1 meaning there is a very high similarity, or correlation, between the partition identifier of the storage command and the partitions referenced in the cache entry. In one example, the comparator 908 may determine a partition similarity score based on a partition access frequency for the cache entry relative to the partition identifier of a storage command received by the storage device 802.

In one example, suppose the storage command refers to partition identifier, NSID 4 and 83% of the logical address to physical address mappings in one of the cache entries reference NSID 4, then the comparator 908 may give this cache entry a partition similarity score of 0.83 to represent an 83% similarity. In another embodiment, the comparator 908 may factor into the partition similarity score how many times the cache entry references a partition and how often prior storage command have referenced a particular partition from the cache entry. In yet another embodiment, the comparator 908 may determine the partition similarity score based on how often prior storage commands have referenced a particular partition from the cache entry.

In one embodiment, the comparator 908 determines a score for a cache entry based on both a partition similarity score and a modified least recently used score (MLRU score). An MLRU score is an assessment, or measure, of how recently logical address to physical address mappings within a cache entry have been used, or referenced, by a storage command in the past and how frequently the cache entry was referenced, either in that same, or a different time period relative to the same assessment, or measure, of other cache entries in the mapping table cache. An MLRU score is different from a least recently used assessment, or score, because rather than just measuring which cache entry was used the longest time in the past, an MLRU score measures how frequently a cache entry has been referenced over a certain time period in addition to whether a cache entry was used the longest time in the past.

In certain embodiments, as part of determining a score, also referred to as a combined score, for a cache entry based on both a partition similarity score and an MLRU score, the comparator 908 assigns a weight to each of the partition similarity score and the MLRU score. The amount of weight the comparator 908 gives to each of the partition similarity score and the MLRU score may be determined by a weighting parameter. A weighting parameter is an indicator of how much weight a comparator 908 is to give two or more score when determining a combined score. The weighting parameter may be predefined. Alternatively, the weighting parameter may be configurable by the cache utilization manager 820, cache manager 812, storage controller 804, storage device 802, or the like. In one embodiment, the weighting parameter is provided by the host. A weighting parameter is but one example of a tuning parameter that a host may define as part of a storage command (e.g., read command or write command or maintenance command) in order to modify a cache eviction policy. A host may use a tuning parameter to adjust a cache eviction policy when a storage command is sent to the storage device 802 to change performance characteristics.

In one example, the weighting parameter is 20% weight to the partition similarity score and 80% weight to the MLRU score. In another example, the weighting parameter is 50% weight to the partition similarity score and 50% weight to the MLRU score.

In one embodiment, the comparator 908 assigns a weight to the partition access frequency and/or the cache access frequency as part of determining a combined score. As with assigning a weight to the scores themselves, the comparator 908 may apply different weights to the partition access frequency and cache access frequency (e.g., 50/50, 70/30, 30/70, etc.) In addition, the comparator 908 may apply the weights based on a weighting parameter and/or may apply the weights to more than two types of frequencies that are cache utilization metrics.

The cache swap manager 904 replaces a cache entry in the mapping table cache with another cache entry loaded from address mapping table in non-volatile memory 806. If the cache manager 900 registers a cache miss and the mapping table cache is not full of cache entries, then the cache swap manager 904 directs the load module 910 to load a cache entry having a logical address that matches the logical address of the storage command that caused the cache miss. If the cache manager 900 registers a cache miss and the mapping table cache is full of cache entries, then the cache swap manager 904 identifies one of the cache entries as a cache eviction candidate.

In certain embodiments, the cache entry replaced (e.g., cache eviction candidate) is a cache entry associated with a partition access frequency that satisfies a cache eviction threshold. For example, suppose the storage command refers to NSID=15, the cache entry replaced may be the cache entry (the cache eviction candidate) with a partition access frequency for a partition with NSID=15 of one access in the last 10,000 storage commands serviced. This cache entry is the one replaced because suppose all other cache entries in the mapping table cache have a partition access frequency for a partition with NSID=15 of greater than 1 access in the last 10,000 storage commands serviced.

The cache swap manager 904 coordinates with the cache utilization manager 902 to determine which cache entry to designate as the cache eviction candidate. In certain embodiments, the utilization tracker 906 and comparator 908 may calculate or revise cache utilization metrics for the cache entries and associate a score or ranking for the cache entries in response to a request from the cache swap manager 904. In other embodiments, the utilization tracker 906 and comparator 908 may reference cache utilization metrics and/or scores or rankings that were calculated previously for the cache entries in response to a request from the cache swap manager 904. In this manner, the cache eviction candidate is determined based on cache utilization metrics.

Once the cache eviction candidate is identified, the cache swap manager 904 replaces the cache eviction candidate in the mapping table cache with a replacement cache entry loaded, by the load module 910, from the address mapping table in non-volatile memory 806. The replacement cache entry is a cache entry that includes a logical address (NSID and LBA or set of NSIDs and LBA ranges) that matches the logical address of the received storage command (e.g., a read command) that caused the cache miss.

The cache manager 812 replaces a cache entry using the load module 910 and store module 912. If a cache eviction candidate has been modified since it was last loaded from the address mapping table, the cache manager 812 directs the store module 912 to store the modified cache eviction candidate to the non-volatile memory 806. Once changes to the cache eviction candidate are preserved, the cache manager 812 directs the load module 910 to load the replacement cache entry from the non-volatile memory 806 into the mapping table cache. With the replacement cache entry in the mapping table cache, the storage controller 804 then uses the mapping table cache 818 to service the storage command.

Figure 10:
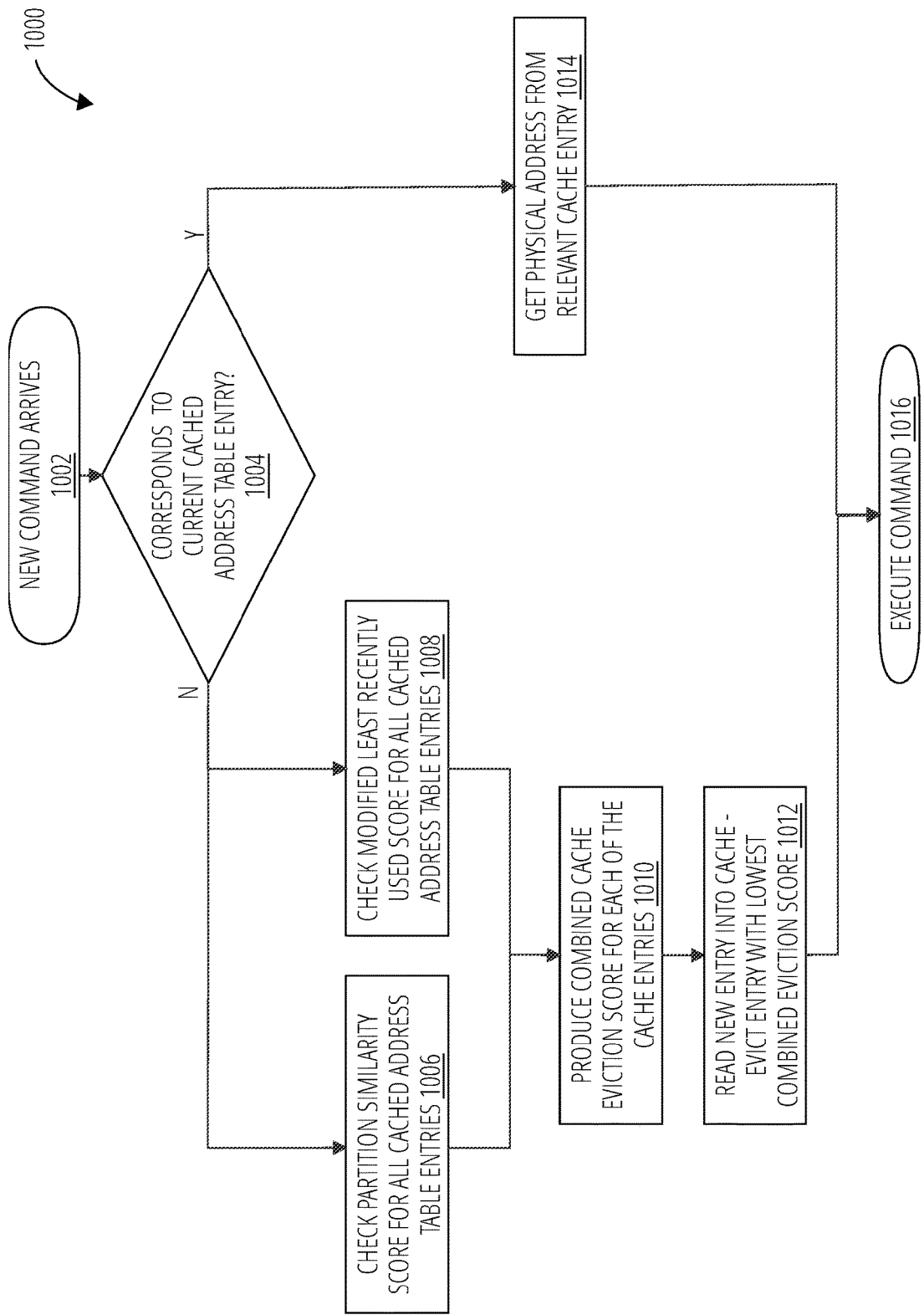
FIG. 10 illustrates a mapping table cache replacement policy 1000 in accordance with one embodiment.

FIG. 10 illustrates a mapping table cache replacement policy 1000 in accordance with one embodiment. This process may be executed by memory device 102 described in FIG. 1. At starting step 1002, a new read command, or write command, sent by a host device arrives at a memory device. In decision step 1004 the cache manager determines whether or not the command references a logical address (based on the NSID and LBA) for a cache entry that currently resides in the mapping table cache. If the command does correspond to, or reference, a logical address of a cached entry, the correct physical address is retrieved (step 1014). The modified least recently used score for the retrieved entry may be modified (e.g., increased) to indicate its most recent access.

Figure 12:
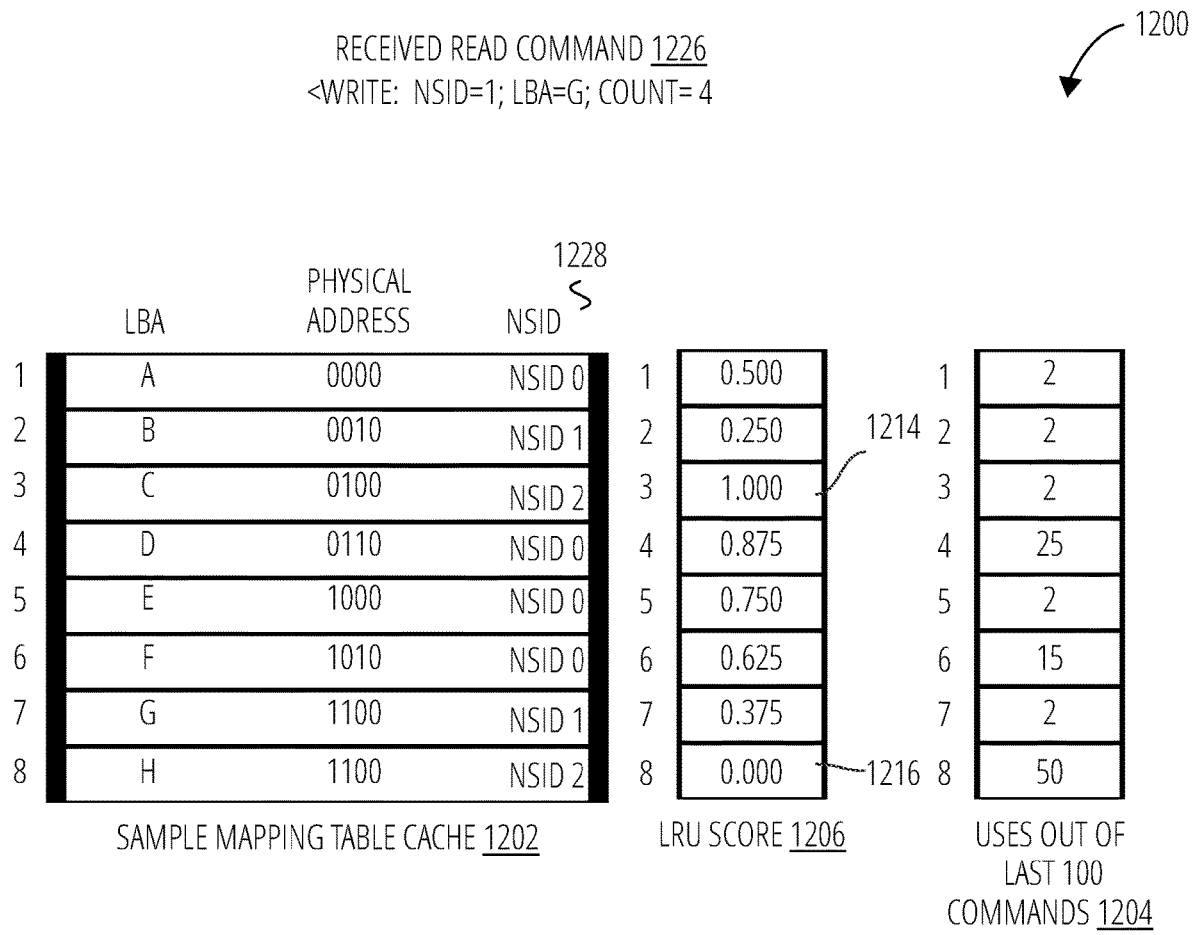
FIG. 12 illustrates an example 1200 in accordance with one embodiment.
Figure 12:
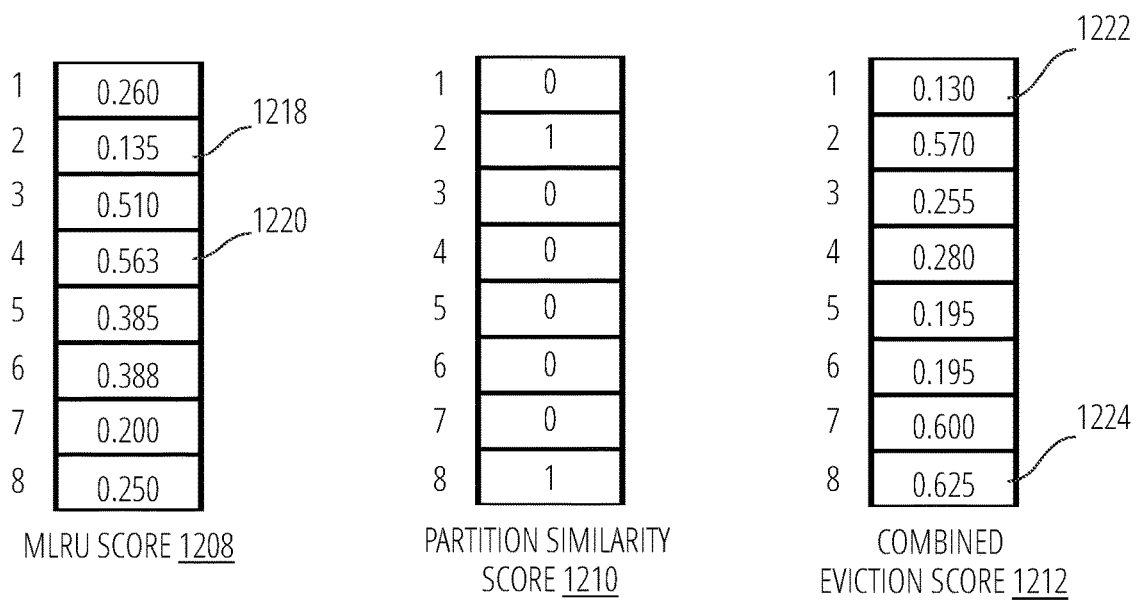

In the case that the command does not correspond to a cached entry, the cache manager checks the partition similarity score in relation to the partition identifier of the command for all mapping table cache entries (step 1006). The modified least recently used score is also checked for all cache entries (step 1008). In step 1010, partition similarity score and modified least recently used score are used to create a combined cache eviction score for each of the cached entries. In step 1012, a new cache entry is added into the mapping table cache. The entry with the lowest combined cache eviction score is evicted (and stored in non-volatile memory 806, if modified) from the mapping table cache to make room for the new entry. Both cases finish at ending step 1016 by executing the received command. Simple example cases adhering to this process are illustrated in FIG. 12.

Figure 11:
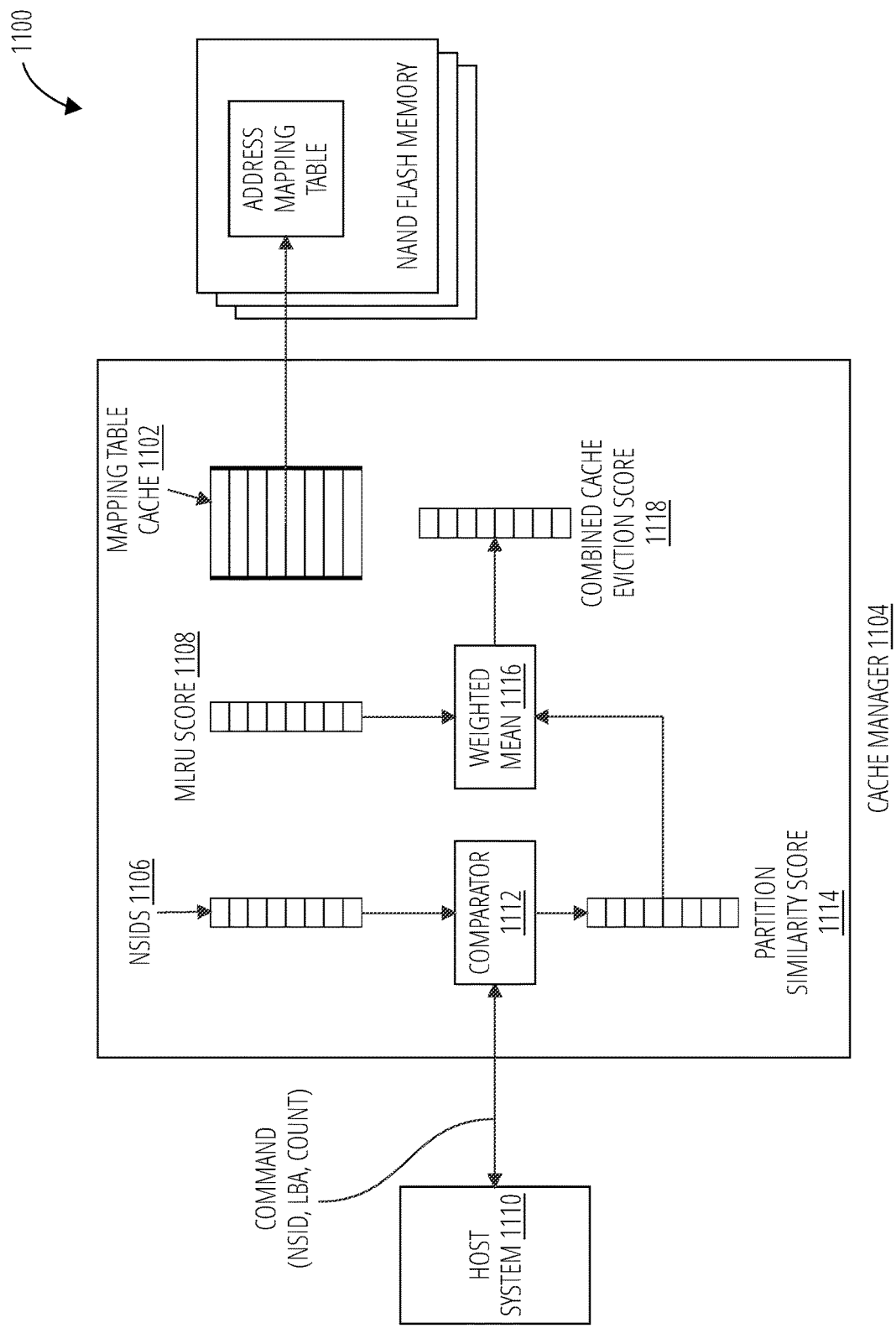
FIG. 11 illustrates a system 1100 in accordance with one embodiment.

FIG. 11 illustrates a system 1100 in accordance with one embodiment. In addition to the mapping table cache 1102, the cache manager 1104 may maintain a list capturing a one-to-one correlation between the NSIDs 1106 of each entry in the mapping table cache 1102, as well as a modified least recently used score 1108. The NSIDs list may include multiple NSIDs for each cache entry.

Commands from the host system 1110 may include an NSID, in addition to the LBA and count for the number of data blocks the command pertains to. This NSID is analogous to a LUN. Both parameters provide the ability for a read command or write command to identify the data as belonging to a logical grouping (logical unit or name space) that may be associated with a specific host application or desired logical memory partition. Each entry in the mapping table cache 1102 represents a recent storage command having an NSID, LBA, and count; the NSIDs 1106 list maintains a record of the NSID contained in each cache entry represented in the mapping table cache 1102.

The cache manager 1104 also maintains a modified least recently used score 1108 for each entry in the mapping table cache 1102. This score incorporates a ranking based on how recently a storage command was received that correlates to each mapping table cache 1102 entry and the frequency with which such storage commands are received.

In some cases, a particular NSID, LBA combination may have been accessed very frequently in the past, but may not have been accessed recently. There may be a situation in which keeping the corresponding entry in mapping table cache in spite of receiving more recent commands might be beneficial. Information on access frequency within a specified time window may be used to weight an entry such that it is not as rapidly evicted as, for example, a more recently used entry that has only been accessed once within that time window.

When a command is received, the NSID included in that command is compared to the NSIDs 1106 by a comparator 1112. This comparison may provide a partition similarity score 1114 for each entry in the mapping table cache 1102. The partition similarity score 1114 measures how similar the command NSID is to NSIDs in a particular cache entry. For example, if the cache entry corresponds to a NSID matching that of the current command, the cache entry may receive a partition similarity score 1114 value of "1," and if NSIDs of the mapping table cache 1102 entry do not match a NSID of the current command, it's partition similarity score 1114 value may be "0." This allows the disclosed method to give preference to mapping table cache 1102 entries for a logical partition that is currently being accessed, and may thus be expected to be in need of additional access soon.

In one embodiment, the comparator 1112 may rank each cache entry in the mapping table cache 1102. The comparator 1112 may calculate the ranking each time a cache miss occurs. Alternatively, the comparator 1112 may store a previously determined ranking of the cache entries. For example, the comparator 1112 may store the a rank with each cache entry in the mapping table cache 1102. Or, the comparator 1112 may store a ranking with each cache entry in the combined cache eviction score 1118. With a stored ranking, the comparator 1112 may revise one or more rankings when a cache miss happens. In another embodiment, described more below, the comparator 1112 may update one or more stored rankings within a sliding look-back window.

A weighted mean 1116 method may be used to combine the partition similarity score 1114 and modified least recently used score 1108 into a combined cache eviction score 1118. The cache manager 1104 may default to weighting the two parameters equally in some embodiments. In other embodiments, the weighting of each parameter may be controlled dynamically through instructions from the host system 1110 (e.g., receiving a weighting parameter). In a situation where a large amount of sequential data will be written, increasing the weight of the partition similarity score 1114 such that it accounts for 80% of the combined cache eviction score 1118 may be desired. The modified least recently used score 1108 may then have a weight that makes up only 20% of the combined cache eviction score 1118. The combined cache eviction score 1118 is then used to determine which entry in the mapping table cache 1102 to evict when a new entry needs to be added, or may be used to determine whether or not the new entry is a lower priority than existing entries, and should not be added at all.

FIG. 12 illustrates an example 1200 in accordance with one embodiment. One of skill in the art will recognize that the disclosed example 1200 represent a very basic and limited interpretation of the disclosed method and system. The disclosed solution may implement the processes and architecture above in ways not reflected in this illustration.

In one embodiment, a normalized set of parameters may be maintained for each entry in a mapping table cache, such that each entry may be assigned a combined cache eviction score between 0 and 1. For example, a very limited sample mapping table cache 1202 may be maintained by a cache manager in the exemplary system. The sample mapping table cache 1202 may maintain 8 cache entries as shown, correlating a physical address in the memory array with an LBA and NSID assigned by a host device.

In the illustrated case, three different namespaces 1228, and are identified with the numbers NSID 0, NSID 1, and NSID 2. In a conventional system, each of the 8 cache entries may be assigned a simple least recently used score (LRU score) between 0 and 1, inclusive, to represent its use rank relative to other cache entries. The most recently used entry has a score of 1, the least recently used a score of 0. In the example shown, the entry on line 3 is most recently used, and thus has the highest LRU score 1214. The entry on line 8 is least recently used and has the lowest LRU score 1216.

To determine an MLRU score 1208, the exemplary system may weight a ranking of the LRU score based other metrics, such as the number uses out of last 100 commands 1204. That is, within the last 100 storage commands, a record is kept of how many of those commands match a cache entry stored in the mapping table cache. For the purposes of this example, this weighting may be accomplished by averaging the LRU score 1206 with a value representing a percentage of the last 100 commands the entry comprises. Thus, an MLRU score 1208 may be obtained through Equation 1 below. Note that this is only one example of how a modified least recently used score may be calculated.

$$MLRU\ Score = \left( \frac{LRU\ Score + (\#\ Reference\ in\ last\ n\ commands/100)}{2} \right) \quad \text{Equation 1}$$

Assuming that 50 (#Ref) of the last 100 (n=100) commands accessed H, entry #8 (1216) of the LRU score table would have it's LRU score 1206 of 0 averaged with a value of 0.5, and thus receive an MLRU score 1208 of 0.250. For purposes of example, we may suppose that entry 4 was used 25 times out of the last hundred commands, entry 6 was used 15 times, and entries 1, 2, 3, 5, and 7 were each used only two times. This would yield an MLRU score 1208 for each entry as shown in the LRU score table 1206. Note that now the most recently used entry, entry 3, no longer has the highest score, due to its infrequency of use. The entry with the highest modified least recently used score 1220 is instead entry 4. Entry 2 has the lowest modified least recently used score 1218, and would be evicted were this the parameter for eviction.

Note also that entry 5 and 6 are very close to the same value. While a tie may be rare, it may be possible through rounding or coincidence for two or more entries to have the same modified least recently used score. Should there be a tie for the lowest modified least recently used score, tie breaking logic may be employed to preference either the most recently used entry or the most frequently used entry, or some other method may be employed, to determine which of the tied entries should be evicted.

Entries in the sample mapping table cache 1202 may be given a partition similarity score 1210 or 0 or 1, based on an NSID stored along with the physical address and LBA, compared with a NSID identified in a received read command 1226. Entries with a NSID matching the received read command 1226 may be assigned a 1, and entries with other NSIDs may be assigned a 0. This is only one possibility. Entries may be assigned a higher score, for example, if a particular NSID is represented in multiple instances, or in a majority of table entries within the mapping table cache.

A combined eviction score 1212 may be generated by averaging the MLRU score 1208 with the partition similarity score 1210. This average may be a weighted mean that more heavily weights the modified least recently used score or the partition similarity score, based on performance optimization preferences for the type of commands that have been executed recently. Using an unweighted mean of the two scores shown yields a combined eviction score 1212 for each entry as indicated. Note that entry 1 now has the lowest combined eviction score 1222. By virtue of being most often used in the last 100 commands and having a NSID matching that in the command under evaluation, entry 8 now has the highest combined eviction score 1224. Whereas it would be evicted using a conventional least recently used method, in the apparatus disclosed herein, it would be maintained in the mapping table cache, and entry 1 would be evicted.

Figure 13:
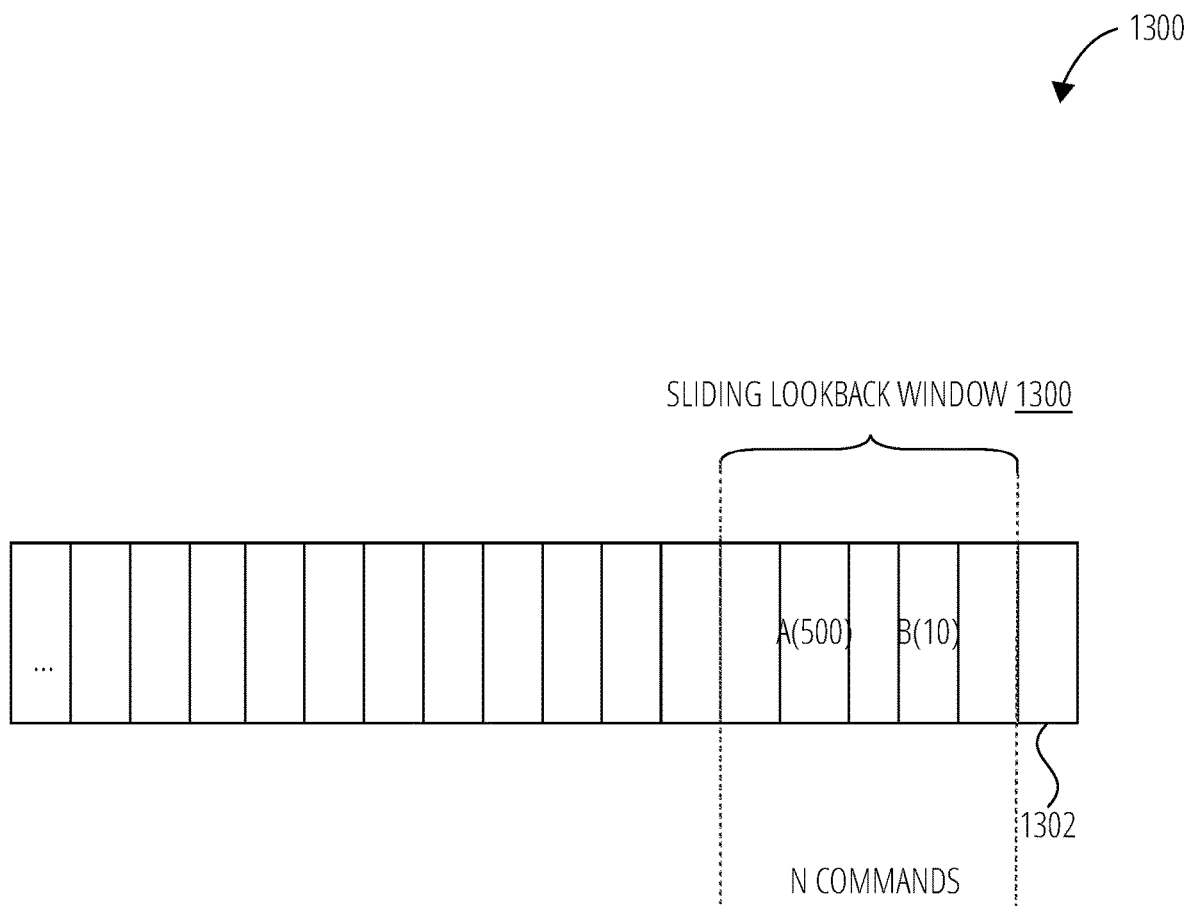
FIG. 13 illustrates a sliding lookback window 1300 in accordance with one embodiment.
Figure 14:
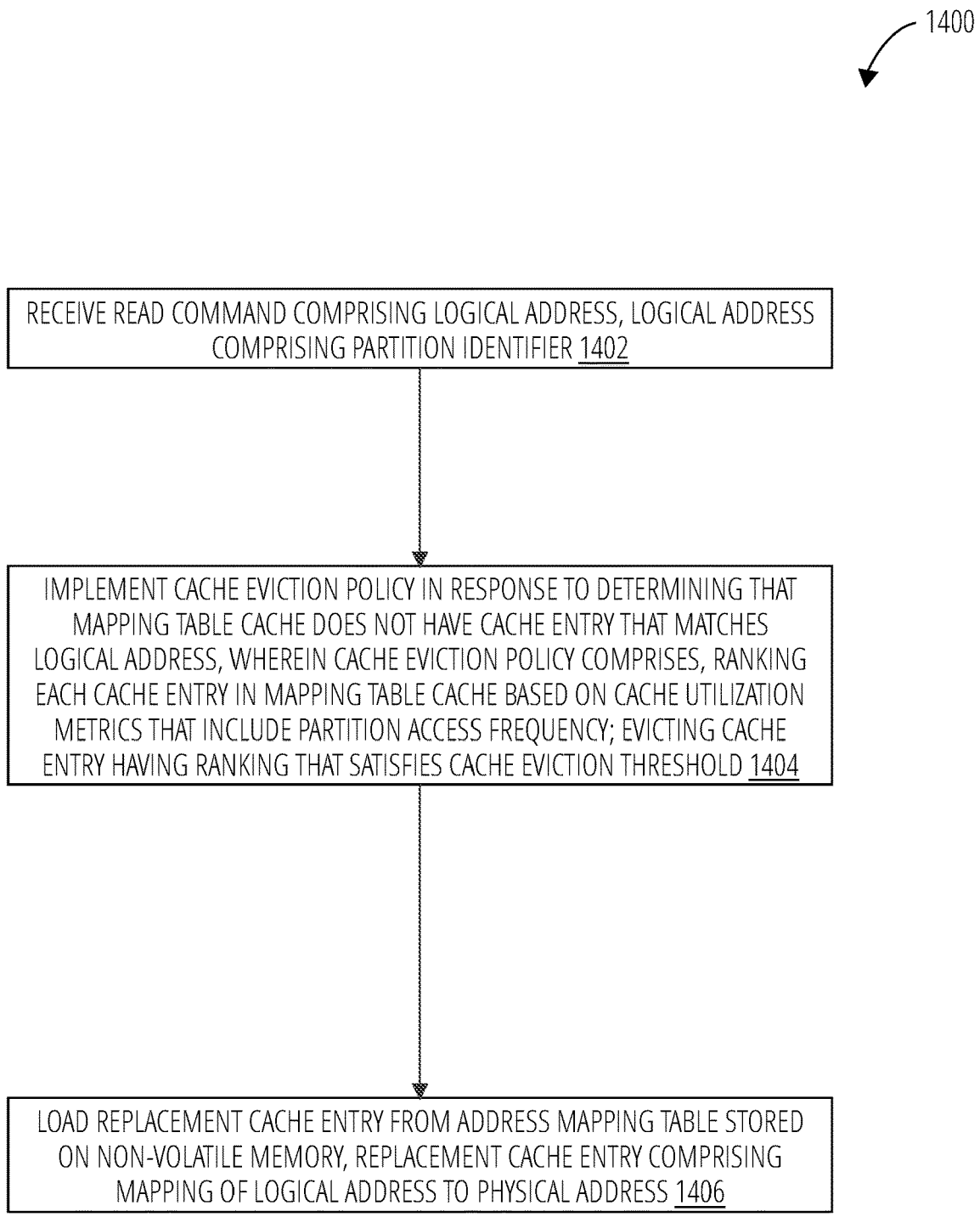
FIG. 14 illustrates a routine in accordance with one embodiment.

FIG. 13 illustrates how a cache manager 900 may determine a modified least recently used score that is a combination of a least recently used cache utilization metric and a most frequently used cache utilization metric.

In certain embodiments, the cache manager 900 maintains a history of storage commands serviced by the storage device 802 and cache utilization metrics associated with one or more of the storage commands. The history may be stored on non-volatile memory 806 and accessed as needed. This history is referred to herein as a sliding lookback window 1300 that includes cache utilization metric records. The sliding lookback window 1300 moves from left to right, adding new cache utilization metric records to the history on the right as the new storage commands are received and removing cache utilization metric records from the left as new storage commands are received in a First-in First-out manner. The cache utilization metric records include the storage command(s) received for a certain period of time or number of commands and cache utilization metrics associated with the storage command(s).

In this manner, the sliding lookback window 1300 uses the cache utilization metric records to retain the order of the storage commands as they are processed.

The cache utilization metrics in the cache utilization metric records in the sliding lookback window 1300 enable the cache manager 900 to determine which partition was most frequently used over a given number of received commands or time period. Each cache utilization metric record may include a timestamp, and for each storage command: the storage command type, the NSID reference, the starting LBA, and a count for the number of LBAs (data blocks) involved. By scanning the sliding lookback window 1300, the cache manager 900 can identify the order of the commands and the frequency with which certain commands have been received.

In one embodiment, the cache manager 900 may traverse the sliding lookback window 1300 to determine which cache entry was least recently used to service a read command. In addition, the cache manager 900 may traverse the sliding lookback window 1300 to determine which cache entry was most frequently used relative to other cache entries in the mapping table cache within the same sliding lookback window 1300. The cache manager 900 may then combine both these sets of information to determine a cache access frequency for each cache entry.

In one embodiment, the cache manager 900 stores ranking information for cache entries in the cache utilization metric records of the sliding lookback window 1300. The cache manager 900 may then update these stored rankings as the cache manager 900 handles more storage commands. In one embodiment, the cache manager 900 maintains cache utilization metrics in the cache utilization metric records for a set number of storage commands, of a certain type, for example for 1000 prior read commands.

In the example illustrated in FIG. 13, cache utilization metric record 1302 stores the storage commands and cache utilization metrics for the most recently received storage commands.

Supposed the size of the sliding lookback window 1300 is 1000 commands (N=1000), cache entry A and cache entry B are in the mapping table cache. Using the cache utilization metric records of the sliding lookback window 1300, the cache manager 900 determines that cache entry A is the least recently used and that cache entry B is the most recently used. However, a cache miss occurs and the cache manager 900 needs to determine whether to evict cache entry A or cache entry B. Using the solutions described and claimed herein, the cache manager 900 further determines that cache entry A has been accessed (e.g., cache access frequency) 500 times when it was last accessed and that cache entry B has been accessed (e.g., cache access frequency) 10 times when it was last accessed. By using the modified least recently used scoring described herein the cache manager 900 evicts cache entry B, even though it was accessed more recently than cache entry A, because cache entry B has not been accessed as frequently.

In block 1402, routine 1400 receives a read command comprising a logical address, the logical address comprising a partition identifier. In block 1404, routine 1400 implements a cache eviction policy in response to determining that a mapping table cache does not have a cache entry that matches the logical address, wherein the cache eviction policy comprises, ranking each cache entry in the mapping table cache based on cache utilization metrics that include a partition access frequency; evicting the cache entry having a ranking that satisfies a cache eviction threshold. In block 1406, routine 1400 loads a replacement cache entry from an address mapping table stored on non-volatile memory, the replacement cache entry comprising a mapping of the logical address to a physical address.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. An apparatus, comprising:
   a cache utilization manager configured to track cache utilization metrics of a mapping table cache based on a logical address, the logical address comprising a partition identifier, a starting logical block address, and a count; and
   a cache swap manager configured to, in response to a cache miss, replace a cache entry in the mapping table cache with a replacement cache entry, the cache entry having cache utilization metrics based on a partition access frequency, the cache utilization metrics satisfying a cache eviction threshold.

2. The apparatus of claim 1, wherein the cache utilization manager comprises a utilization tracker configured to monitor, for each cache entry, which partitions are associated with the cache entry and to monitor a partition access frequency that identifies how many times a partition associated with the cache entry is referenced by a storage command being serviced by the apparatus.

3. The apparatus of claim 1, wherein the partition access frequency comprises how often the apparatus receives a read command with a logical address identifying a partition identifier referenced within a cache entry.

4. The apparatus of claim 1, wherein the cache utilization manager comprises a comparator configured to determine a score for each cache entry, the score based on the cache utilization metrics.

5. The apparatus of claim 4, wherein the comparator is configured to determine the score based on a partition similarity score, the comparator determining the partition similarity score by determining the partition access frequency in relation to the partition identifier.

6. An apparatus, comprising:
   a cache utilization manager configured to track cache utilization metrics of a mapping table cache based on a logical address, the logical address comprising a partition identifier, a starting logical block address, and a count, the cache utilization manager comprising a comparator configured to:
   determine a score for each cache entry, the score based on the cache utilization metrics; and
   determine the score based on both a partition similarity score and a modified least recently used score relative to a logical address of a read command received by the apparatus; and
   a cache swap manager configured to replace a cache entry in the mapping table cache with a replacement cache entry, the cache entry having cache utilization metrics based on a partition access frequency, the cache utilization metrics satisfying a cache eviction threshold.

7. The apparatus of claim 6, wherein the comparator is configured to weight the partition similarity score and to weight the modified least recently used score based on a weighting parameter.

8. A system, comprising:
a non-volatile memory configured to store an address mapping table;
a volatile memory configured to store a mapping table cache comprising a set of cache entries;
an input/output (IO) interface configured to receive a storage command comprising a logical address that uniquely identifies a set of data blocks stored on the non-volatile memory;
a cache manager configured to load cache entries from the non-volatile memory into the volatile memory;
a cache utilization manager configured to manage cache utilization metrics based on a partition access frequency and a cache access frequency;
a cache swap manager configured to determine, in response to a cache miss, a cache eviction candidate based on the cache utilization metrics and on the logical address and to replace the cache eviction candidate in the mapping table cache with a replacement cache entry corresponding to the logical address of the storage command; and
a storage controller configured to service the storage command using a physical address provided by the cache manager.

9. The system of claim 8, wherein the cache utilization manager comprises a utilization tracker configured to monitor, for each cache entry, which partitions are associated with the cache entry and a partition access frequency that identifies how many times a partition associated with the cache entry is referenced by a storage command serviced by the system.

10. The system of claim 8, wherein the cache utilization manager comprises a utilization tracker configured to monitor, for each cache entry, a cache access frequency relative to other cache entries in the mapping table cache.

11. The system of claim 8, wherein the partition access frequency comprises how often the system receives a storage command with a logical address identifying a partition identifier referenced within a cache entry.

12. The system of claim 8, wherein the cache utilization manager comprises a comparator configured to determine a score for each cache entry, the score based on the cache utilization metrics.

13. The system of claim 12, wherein the comparator is configured to apply a different weight to the partition access frequency than to the cache access frequency to determine the score.

14. The system of claim 13, wherein the cache access frequency comprises a modified least recently used score comprising a combination of which cache entry was least recently used to service a storage command and which cache entry was most frequently used relative to other cache entries in the mapping table cache during a sliding lookback window.

15. A method, comprising:
receiving a read command comprising a logical address, the logical address comprising a partition identifier;
implementing a cache eviction policy to determine which cache entry to evict when a cache miss occurs, wherein the cache eviction policy is implemented in response to determining that a mapping table cache does not have a cache entry that matches the logical address, wherein the cache eviction policy comprises, ranking each cache entry in the mapping table cache based on cache utilization metrics that include a partition access frequency;
evicting the cache entry having a ranking that satisfies a cache eviction threshold; and
loading a replacement cache entry from an address mapping table stored on non-volatile memory, the replacement cache entry comprising a mapping of the logical address to a physical address.

16. The method of claim 15, wherein ranking comprises determining a score for each cache entry in the mapping table cache.

17. A method, comprising:
receiving a read command comprising a logical address, the logical address comprising a partition identifier;
implementing a cache eviction policy in response to determining that a mapping table cache does not have a cache entry that matches the logical address, wherein the cache eviction policy comprises, ranking each cache entry in the mapping table cache based on cache utilization metrics that include a partition access frequency, wherein the ranking comprises determining a score for each cache entry in the mapping table cache, and wherein the score comprises a combination of a weighted partition similarity score and a weighted modified least recently used score;
evicting the cache entry having a ranking that satisfies a cache eviction threshold; and
loading a replacement cache entry from an address mapping table stored on non-volatile memory, the replacement cache entry comprising a mapping of the logical address to a physical address.

18. The method of claim 15, further comprising storing a ranking for each cache entry and the ranking comprises updating a stored ranking for each cache entry in the mapping table cache within a sliding lookback window.

19. The method of claim 18, wherein the sliding lookback window comprises cache utilization metrics for N prior read commands, N>1000.

20. The method of claim 15, modifying the cache eviction policy based on a tuning parameter provided by a host configured to send the read command.

* * * * *